United States Patent
Kozlov et al.

(10) Patent No.: US 6,657,591 B2
(45) Date of Patent: Dec. 2, 2003

(54) METHOD AND APPARATUS FOR JOINT IDENTIFICATION AND DIRECTION FINDING

(75) Inventors: Inna Kozlov, Haifa (IL); Zvi Zlotnick, Haifa (IL); Eitan Zeiler, Haifa (IL)

(73) Assignee: Electro-Optics Research & Development Ltd., Haifa (IL)

( * ) Notice: Subject to any disclaimer, the term of this patent is extended or adjusted under 35 U.S.C. 154(b) by 0 days.

(21) Appl. No.: 10/073,018

(22) Filed: Feb. 12, 2002

(65) Prior Publication Data

US 2002/0140605 A1 Oct. 3, 2002

Related U.S. Application Data

(60) Provisional application No. 60/267,745, filed on Feb. 12, 2001.

(51) Int. Cl.[7] .................................................. G01S 5/02
(52) U.S. Cl. ........................................ 342/417; 342/424
(58) Field of Search ........................... 342/357.07, 417, 342/424, 427, 443

(56) References Cited

U.S. PATENT DOCUMENTS

| | | | | |
|---|---|---|---|---|
| 5,045,860 A | * | 9/1991 | Hodson | 342/451 |
| 5,252,980 A | * | 10/1993 | Gray et al. | 342/59 |
| 5,525,967 A | * | 6/1996 | Azizi et al. | 340/573 |
| 6,169,497 B1 | * | 1/2001 | Robert | 340/988 |

* cited by examiner

Primary Examiner—Dao Phan
(74) Attorney, Agent, or Firm—Mark M. Friedman

(57) ABSTRACT

A method and apparatus for tracking a target. A signal from the target is received using a directional antenna and is digitized to provide a time series of samples. The samples are transformed, preferably by a wavelet transform. A signature of the target is identified in some of the transformed samples and a direction to the target is determined from others of the transformed samples. Target identification and target direction determination are iterated, with the identification being based on the most recently determined direction, and with the direction determination being based on the most recent identification, until a termination criterion is satisfied. Using wavelet transforms gives the antenna an effective beamwidth twenty percent narrower than the antenna aperture.

19 Claims, 6 Drawing Sheets

METHOD AND APPARATUS FOR JOINT IDENTIFICATION AND DIRECTION FINDING

This application claims the benefit of provisional application Ser. No. 60/267,745 filed Feb. 12, 2001.

FIELD AND BACKGROUND OF THE INVENTION

The present invention relates to direction finding and, more particularly, to a method and apparatus for identifying and tracking a target in a noisy environment.

Amir Averbuch, et al., in "A wavelet packet algorithm for classification and detection of moving vehicles", *Multidimensional Systems and Signal Processing* vol. 12 pp. 9–31 (2001), which is incorporated by reference for all purposes as if fully set forth herein, describe a method of detecting the presence of a member of a class of acoustic emitters (for example, a vehicle of a particular type) on the basis of an analysis of the acoustic signature of the class member. A wavelet transform is applied to several overlapping portions, each of length n, of a received acoustic signal, up to a preselected level m. Each transform produces mn transform coefficients arranged in $2^{m+1}-1$ blocks associated with different frequency bands. Only the blocks known to be associated with a signature of the target class are retained for further processing. The energies of these blocks are computed and compared to the energies of these blocks that were previously measured for representative members of both the target class and other classes from which members of the target class are to be discriminated. Each transform thus is associated with one of the classes for which signature block energies have been measured. The acoustic emitter is assigned to the class with which the most transforms are associated. The measure of the confidence with which the acoustic emitter has been identified is the ratio of the number of transforms associated with the winning class to the total number of transforms.

The present invention is an extension of the methodology of Averbuch et al. to direction finding. For example, the present invention can be used to identify and track enemy combat vehicles such as airplanes and helicopters.

SUMMARY OF THE INVENTION

According to the present invention there is provided a method of tracking a target, including the steps of: (a) receiving a signal; (b) identifying, in the signal, a signature of the target; (c) determining, from the signal, a direction to the target; and (d) iterating the identifying and the determining, each identifying after a first the identifying being based on an immediately preceding determining.

According to the present invention there is provided a method of tracking a target, including the steps of: (a) receiving a signal; (b) identifying, in the signal, a signature of the target; (c) determining, from the signal, a direction to the target; and (d) iterating the identifying and the determining, each determining being based on an immediately preceding identifying.

According to the present invention there is provided an apparatus for tracking a target, including: (a) a receiver for receiving a signal; and (b) a processor for: (i) identifying, in the signal, a signature of the target, (ii) determining, from the signal, a direction to the target, and (iii) iterating the identifying and the determining, each identifying after a first identifying being based on an immediately preceding determining.

According to the present invention there is provided an apparatus for tracking a target, including: (a) a receiver for receiving a signal; and (b) a processor for: (i) identifying, in the signal, a signature of the target, (ii) determining, from the signal, a direction to the target, and (iii) iterating the identifying and the determining, each determining being based on an immediately preceding identifying.

According to the present invention there is provided an apparatus for receiving a signal, including: (a) an antenna, having an aperture, for receiving a plurality of representations of the signal; and (b) a processor for processing the representations in a manner that gives the antenna an effective beamwidth at least twenty percent smaller than a reciprocal of the aperture.

The present invention is directed towards the identification and tracking of an emitter of any kind of wave energy, for example electromagnetic energy. Nevertheless, the examples herein relate to the identification and tracking of a target that emits acoustic energy. Correspondingly, the term "microphone" as used herein is to be understood as referring to the special case of an antenna element for receiving acoustic signals. The target may be stationary or moving.

The point of innovation of the present invention is the iterative alteration of identification and direction finding, with the results of each identification step being used as a basis for the immediately subsequent direction finding step, and with the results of each direction finding step being used as a basis for the immediately subsequent identification step. Specifically, the results of each identification step are used to improve the immediately subsequent direction finding step, and the results of each direction finding step are used to improve the immediately subsequent identification step. The iteration continues until a termination criterion is satisfied. One such termination criterion is that the target is identified at a confidence level exceeding a predetermined threshold. Another such termination criterion is that the direction finding converges.

As described above, the identification method of Averbuch et al. includes applying a discrete transform, specifically a wavelet transform, to sections of a received signal. For identification only, the signal could be received using an omnidirectional antenna. For the purpose of combined identification and direction finding, however, the signal is received using a directional antenna, for example a phased array antenna composed of a plurality of antenna elements. The antenna elements could be arranged, for example, in a linear array or in a circular array. "Receiving" the signal is to be understood as including digitizing the signal as received by the antenna elements to provide, for each antenna element, a corresponding set of signal samples. It is these signal samples, or subsets thereof, that are input to the discrete transform.

Preferably, the iterative alteration between identification and direction finding relies on using the same discrete transform for both identification and direction finding. Direction finding is effected by finding the direction that maximizes the energy of a weighted sum of the transform coefficients output from the discrete transform in each direction finding step. Preferably, the only transform coefficients that enter this weighted sum are transform coefficients whose basis functions are associated with the target signature that is used in the identification steps. The direction found in each direction finding step then is used in the subsequent identification step, to form, for each basis function associated with the target signature, a direction-weighted sum of the corresponding transform coefficients output from the discrete transform in that identification step.

Although the scope of the present invention includes any suitable discrete transform, for example a discrete Fourier transform, the preferred discrete transform is a wavelet transform. The most preferred discrete transform is a wavelet transform whose basis functions are eighth-order spline wavelet packet functions and in which the wavelet decompositions are continued to seventh order.

An apparatus of the present invention includes a receiver for receiving the signal and a processor for implementing the iterative alteration between identification and direction finding. The receiver includes an antenna, as described above. Using a wavelet transform as the discrete transform allows the antenna to have an effective beamwidth that is smaller than the reciprocal of the antenna aperture by twenty percent, or even by thirty percent.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method and apparatus for identifying and tracking a target in a noisy environment, by iterating between identification and direction finding.

The principles and operation of iterative tracking according to the present invention may be better understood with reference to the drawings and the accompanying description.

Figure 1:
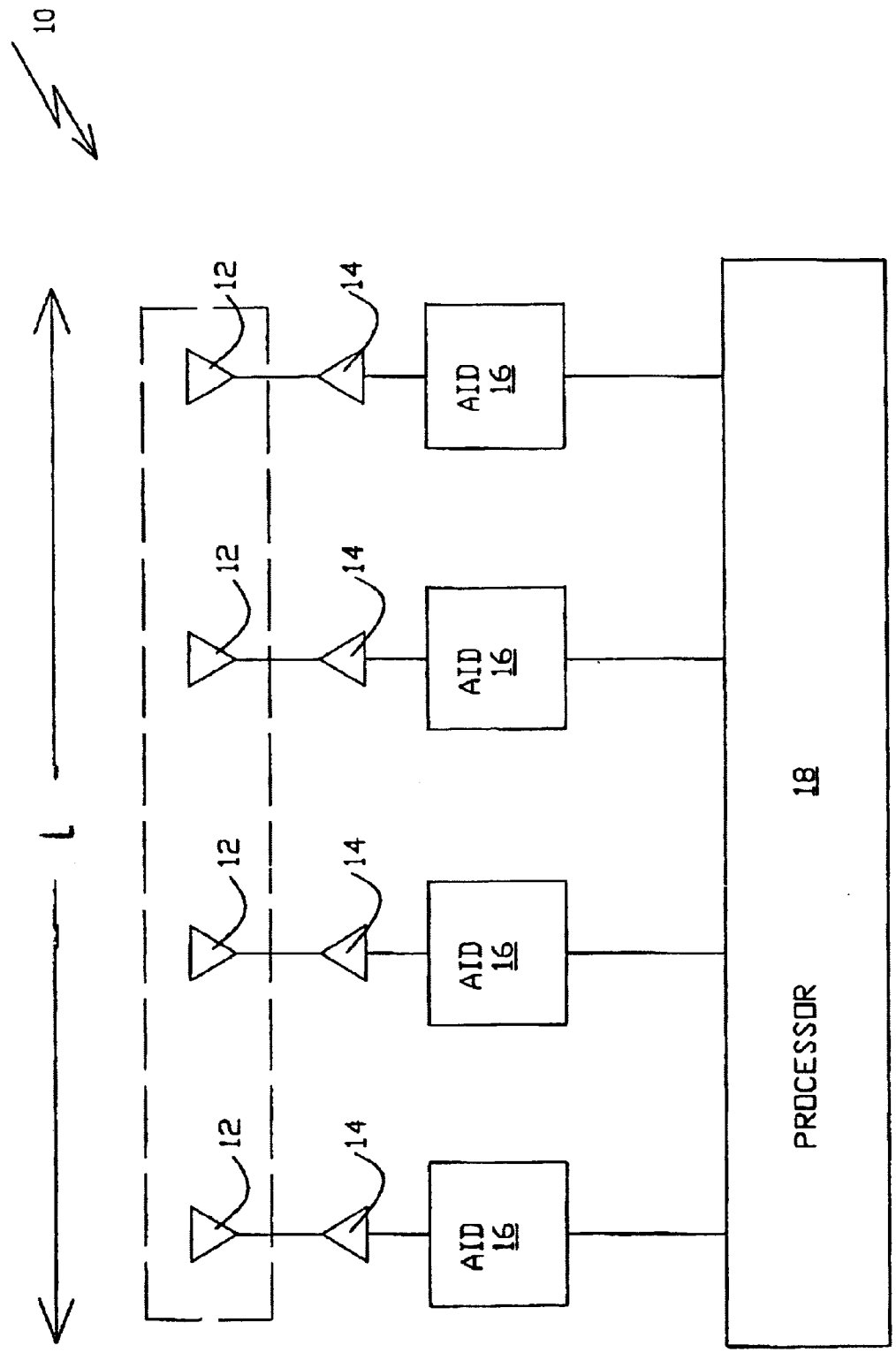
FIG. 1 is a high level block diagram of an apparatus of the present invention.

Referring now to the drawings, FIG. 1 illustrates an apparatus 10 of the present invention. Apparatus 10 is shown as having a phased array antenna 11 with four antenna elements 12 that receive wave energy. As noted above, for the purpose of receiving acoustic energy, antenna elements 12 could be microphones. Analog signals from antenna elements 12 are amplified by respective amplifiers 14 and digitized by respective digitizers 16 to provide digital signals to a processor 18. Processor 18 executes the algorithms of the present invention, as described below.

Antenna 11 is shown as a linear array of antenna elements 12. The aperture of antenna 11 is the length L of this linear array. Alternatively, antenna 11 could be a circular array of antenna elements 12, in which case the aperture of antenna 11 would be the diameter of the circle.

The present invention is described herein in terms of finding an azimuth $\phi$ to a target. A one-dimensional array of antenna elements 12, such as is illustrated in FIG. 1, is adequate for finding a single-component direction such as the azimuth of a ground vehicle that necessarily moves in a plane. It will be obvious to those skilled in the art how to extend the present invention to track a target that moves in a volume by determining a two-component (for example, azimuth and elevation) direction to the target; for that purpose, antenna 11 would have to be a two-dimensional array of antenna elements 12.

As noted above, the preferred discrete transform of the present invention is a wavelet transform, as used by Averbuch et al. for identification. Therefore, the embodiment of the present invention that is described herein is based on the use of wavelet transforms. It will be clear to those skilled in the art how to implement the present invention using other discrete transforms, for example Fourier transforms.

For illustrational simplicity, antenna 11 is shown as having only four elements 12. Four is the smallest practical number of elements 12 that antenna 12 can have. The most suitable number N of elements to use in any given case can be selected easily by one skilled in the art. Beam-forming software in processor 18 allows the synthesis of N−1 independent directive beams simultaneously. For the wavefront defined by the wavenumber k, the receiving beam E($\phi$) associated with azimuth $\phi$ is $$E(\varphi) = \sum_{n=1}^{N} a_n \exp(-j\psi_n)\exp(-jkG_n(\varphi)) \quad (1)$$

where $a_n$ is the amplitude of the n-th beam, $\psi_n$ is the phase of the n-th beam, j is the square root of −1, k is related to the wavelength $\lambda$ of the received radiation by k=2π/$\lambda$, and $G_n(\phi)$ depends on the geometry of the antenna. For a linear antenna 11, as illustrated, with a uniform spacing d between antenna elements 12, $$G_n(\phi)=d(n-1)\cos \phi \quad (2)$$

For a circular antenna, with N antenna elements distributed uniformly around the circumference of a circle of radius r centered on the origin of a Cartesian (x,y) coordinate system, if the first (n=1) antenna element is on the +x-axis, then $$G_n(\phi)=r \cos (\phi-\phi_n) \quad (3)$$

where $\phi_n$=2π(n−1)/N and $\phi$ is measured relative to the x-axis.

The frequency distribution ($a_n,\psi_n$) of an apparatus 10 defines the form of the receiving beams and the directions of the receiving beams. For an acoustic apparatus 10 that tracks remote acoustic sources, the simplest assumption is that all antenna elements 12 (microphones) are similar so that all $a_n$=1.

The direction-finding algorithm of the present invention seeks an azimuth $\phi_0$ that maximizes the $l_2$ norm of E. The direction to the target that is obtained by this algorithm is precise if the signals emitted by the target have stable significant frequencies. In the case of the target being a moving vehicle, the emitted signal is quasi-periodic and the frequencies vary with time. In this situation, it is necessary to average in the frequency domain. That is, if the frequency band containing the dominant frequencies of the target is known, the azimuths $\phi_i$, i∈[1,s], for the s most significant frequencies of this band, are averaged to provide an estimate of the actual azimuth to the target.

Suppose that the frequency band containing the dominant frequencies of a target is known. Let $\Phi_L^J$ be a waveform for a wavelet packet family related to this frequency band., where J is a decomposition level and L is a block number in decomposition level J. The signal, to be decomposed, that is received via the m-th antenna element, is denoted by $X^m$, and includes $2^N$ samples $x_1^m$ through $x_{2^N}^m$.

Denote by $\{c^m(i)\}_{i=1}^{2^{N-L}}$ the coefficients of the chosen block of the wavelet packet decomposition determined by the waveform $\Phi_L^J(t - t_i)$ for signal $X^m$, where $t_i = 2^{-(N-L)} i t_0$, $i \in [1, 2^{N-L}]$ and $t_0$ is the duration of the signal. Then the receiving beam E is expressed in terms of the wavelet packet decomposition waveforms by $$E(\varphi) = \sum_{n=1}^{N} \sum_{i=1}^{2^{N-L}} c^n(i) \Phi_L^J(t - t_i - t^n) \quad (4)$$

where $t^n$ is the time delay of the n-th antenna element. For a uniform linear antenna 11, $t^n(\phi) = (N-n)\cos(\phi)/u_0$, and for a uniform circular antenna of radius r, $t^n(\phi) = r(1 - \cos(\phi_n - \phi))/u_0$, where uo is the speed of propagation of the signal. Note that the sum in equation (4) is a weighted sum of the coefficients $c^n(i)$ associated with the chosen block. The weights are functions of azimuth $\phi$, via time delays $t^n$. The direction to the target is the azimuth $\phi_0$ that maximizes the $l_2$-norm of the beam.

As described above, the identification procedure of Averbuch et al. is based on a set of discriminant blocks $\{B\}$. Each block B corresponds to a particular set of coefficients $w_l^m$ of the wavelet transform, where m is the level of the transform and l is an index of the coefficient within level m. The present invention begins with a calibration or training procedure, that is described in detail in Averbuch et al., in which a set of M blocks $B_l$ through $B_M$ are selected that characterize the classes of targets to be identified and tracked. Usually, M is less than 10. This phase of the present invention is computationally expensive, but needs to be done only once.

The identification and tracking phase of the present invention now will be described with reference to apparatus 10 that has a linear phased array antenna 11. The present description applies, mutatis mutandis, to similar apparatuses with phased array antennas of other geometries.

The first step in tracking a target is identifying the target, i.e., detecting the presence of the target as described by Averbuch et al. For this purpose, one of antenna elements 12 is used as an omnidirectional antenna. Alternatively, to increase the signal-to-noise ratio, the outputs of antenna elements 12 are added together in accordance with an arbitrarily chosen azimuth $\phi$, for example $\phi=0$. The sum of equation (4) is evaluated for each of the M blocks; the $l_1$ or $l_2$ norm of the sum is used as a measure of the energy of that block.

The next step is a direction finding step. More signal samples are recorded; and the azimuth $\phi_0$ that maximizes $l_2$-norm of the sum in equation (4), in the block $B_{max}$ in which targets of the identified class are expected to have the most energy, is found. This azimuth is an estimate of the direction to the target.

In the next step, the identification step is repeated, using a coherent sum of the outputs of all antenna elements 12. As before, the sum of equation (4) is evaluated for each of the M blocks; but this time, the value of the azimuth determined in the immediately preceding direction finding step is used as the azimuth $\phi$.

Direction finding and identification are iterated until a termination criterion is satisfied. One such termination criterion is related to the identification steps: the criterion is that the confidence of the identification exceeds a preselected threshold, for example 0.8. Another such termination criterion is that a quantity related to the azimuth $\phi_0$ converges to a stable value. In the case of a stationary target, this quantity is $\phi_0$ itself. In the case of a moving target, the quantity is a function of $\phi_0$ that depends on a model of the predicted behavior of the target, as is known to those skilled in the art.

As noted above, each identification step is improved by relying on the azimuth $\phi_0$ determined in the immediately preceding direction finding step. In addition, because the coefficients $c^n(i)$ of each identification step are computed ab initio, each direction finding step is improved by using the coefficients $c^n(i)$ of the immediately preceding identification step.

Figure 2:
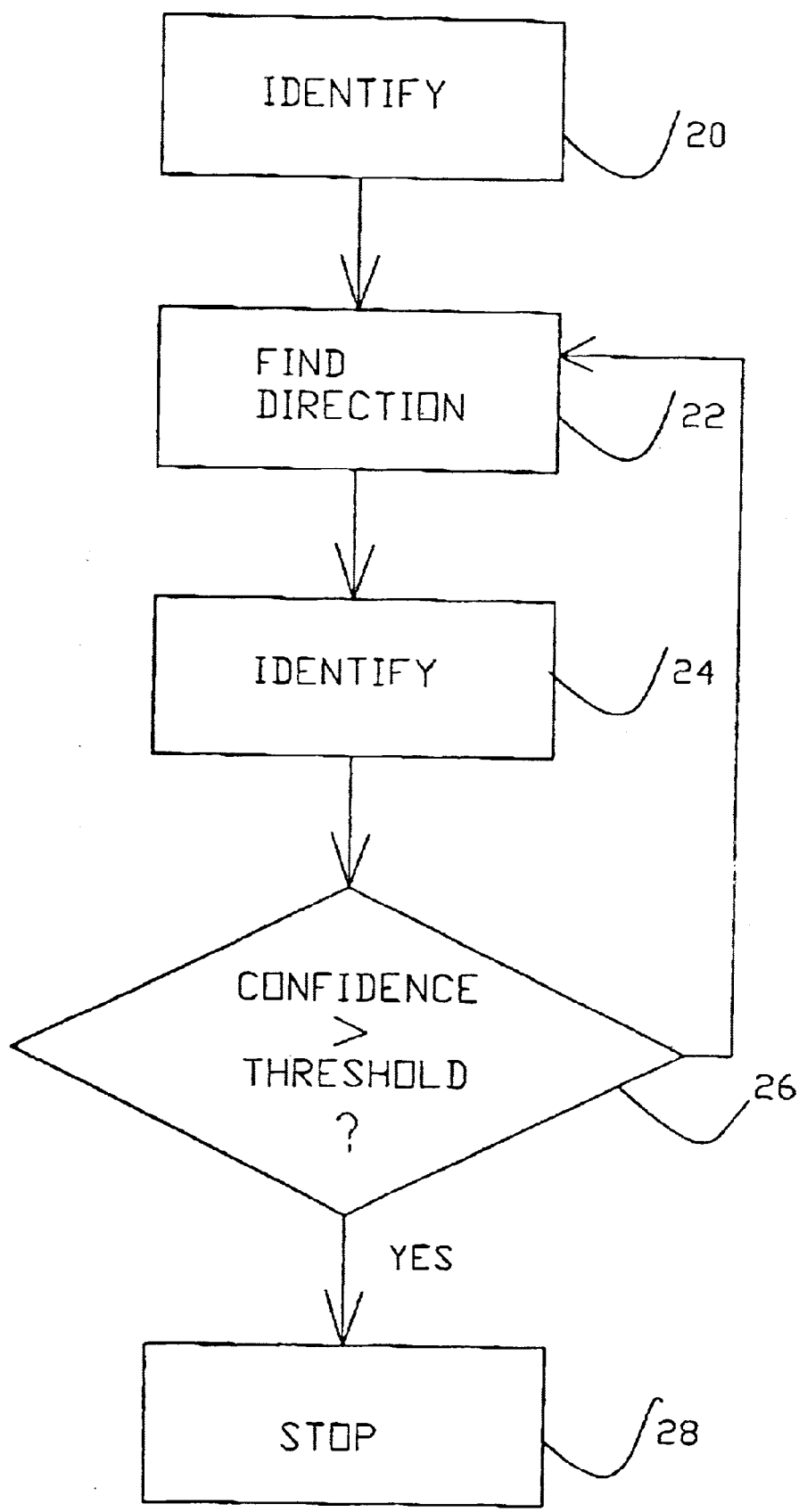
FIG. 2 is a flow chart of the method of the present invention.

FIG. 2 is a flow chart of the method of the present invention. In block 20 the target is identified. In block 22, the direction to the target is determined. In block 24, the identity of the target is confirmed, based on the direction determined in block 22. In block 26, the confidence level of the identification of block 24 is compared to a threshold. If the confidence level exceeds the threshold then the algorithm is finished (block 28). Otherwise the direction to the target is again determined in block 22.

Figure 3:
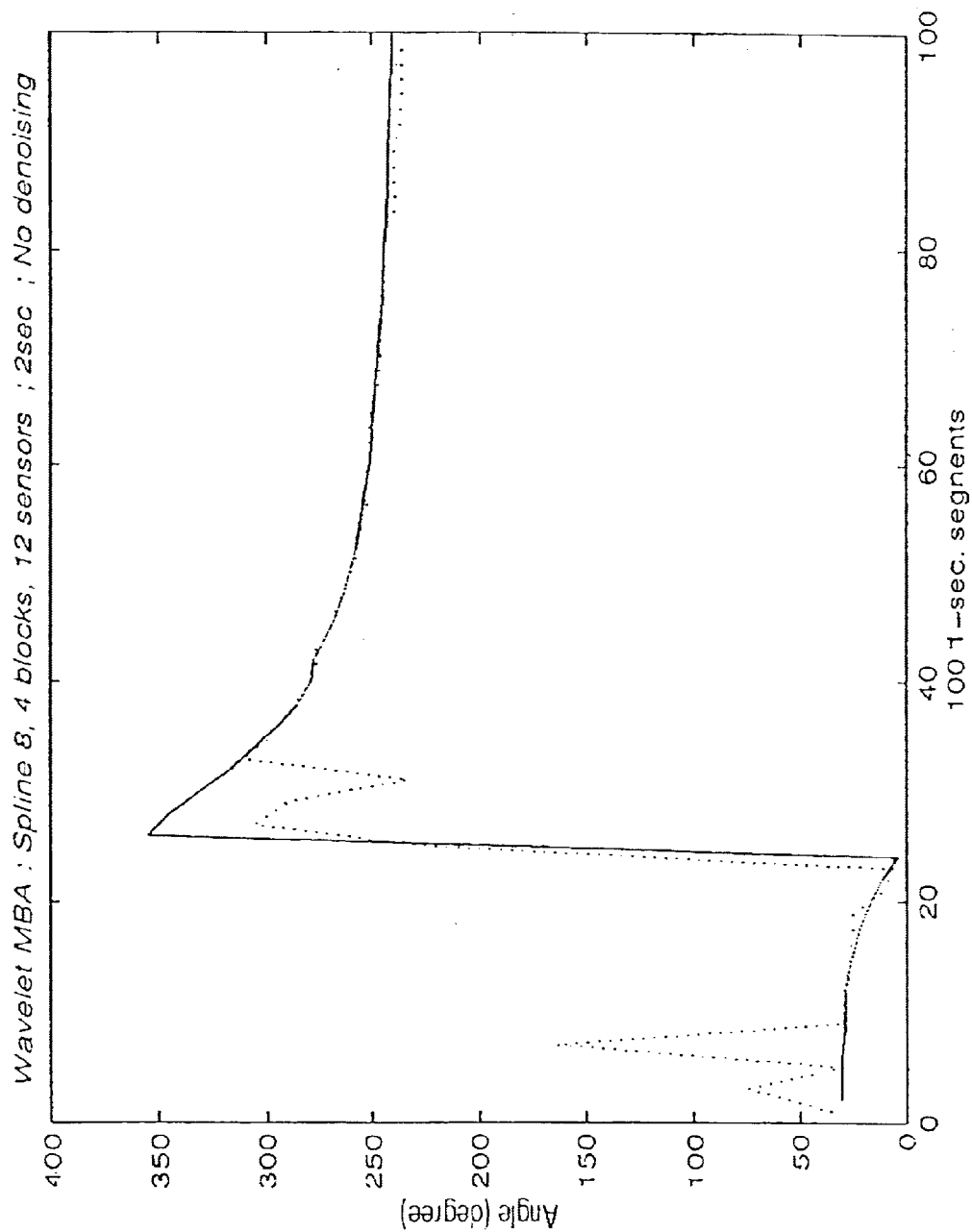
FIG. 3 shows azimuth angles determined, as a function of time, to a truck passing an apparatus of the present invention, using a less preferred embodiment (Fourier transform) vs. a more preferred embodiment (wavelet transform)

The present invention was implemented using a circular phased array antenna of 12 microphones to identify and track a passing truck. Both a discrete Fourier transform and a discrete wavelet transform were used to effect the signal processing. The wavelet transform basis was an eighth order spline wavelet packet. The decomposition was continued to level J=7. FIG. 3 shows the azimuth angles determined using the discrete Fourier transform (dotted line) and using the wavelet transform (solid line).

Figure 4:
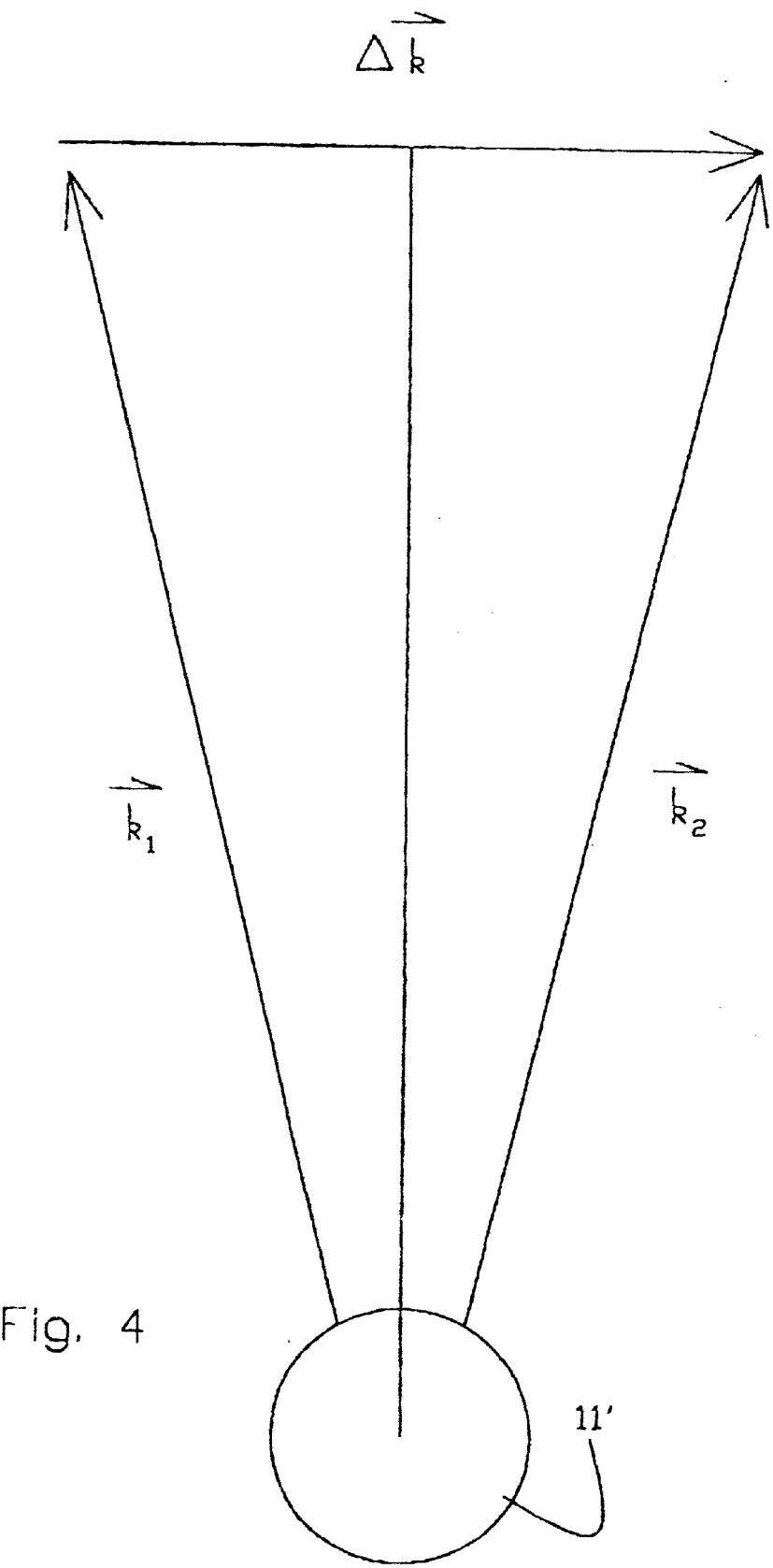
FIG. 4 illustrates the definition of beamwidth.
Figure 5:
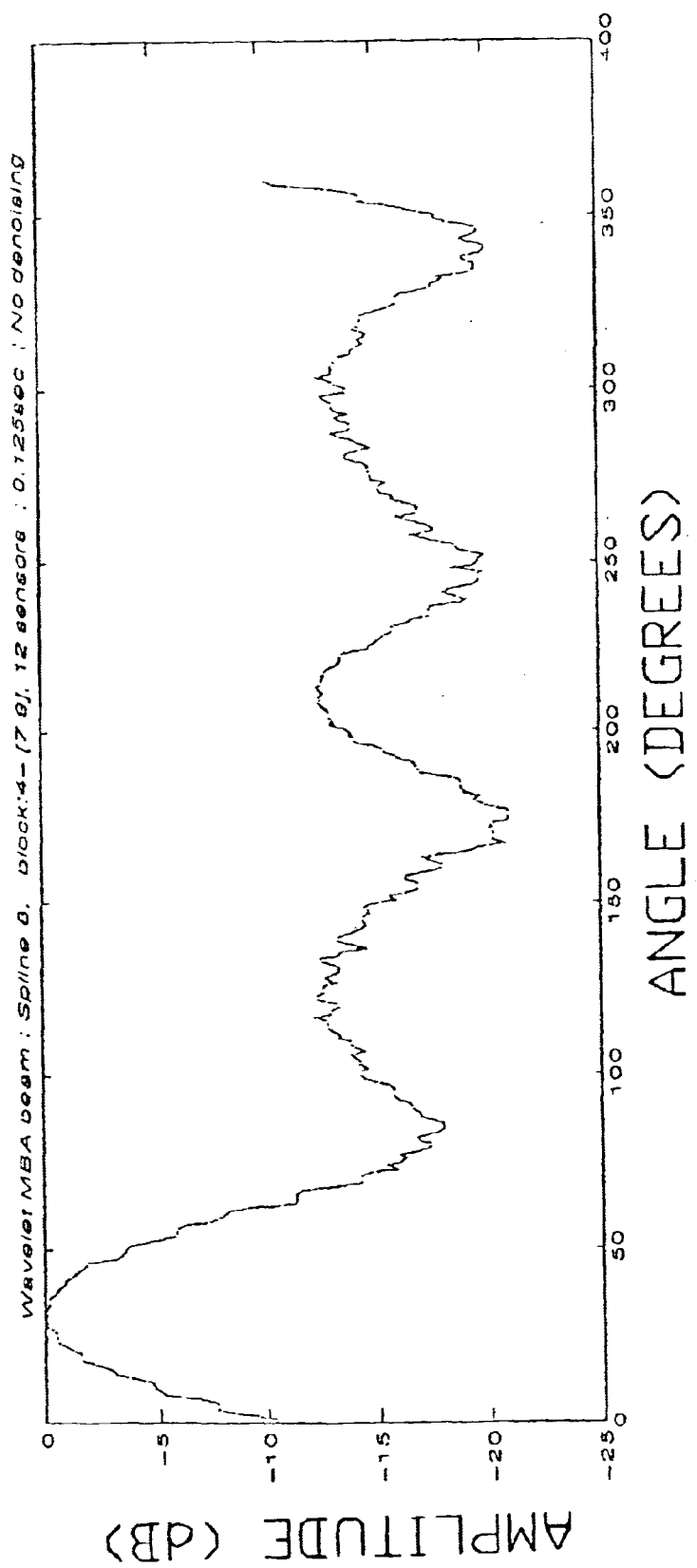
FIGS. 5 (wavelet transform) and 6 (Fourier transform) are plots of two of the synthetic beams of the experiment of FIG. 4.
Figure 6:
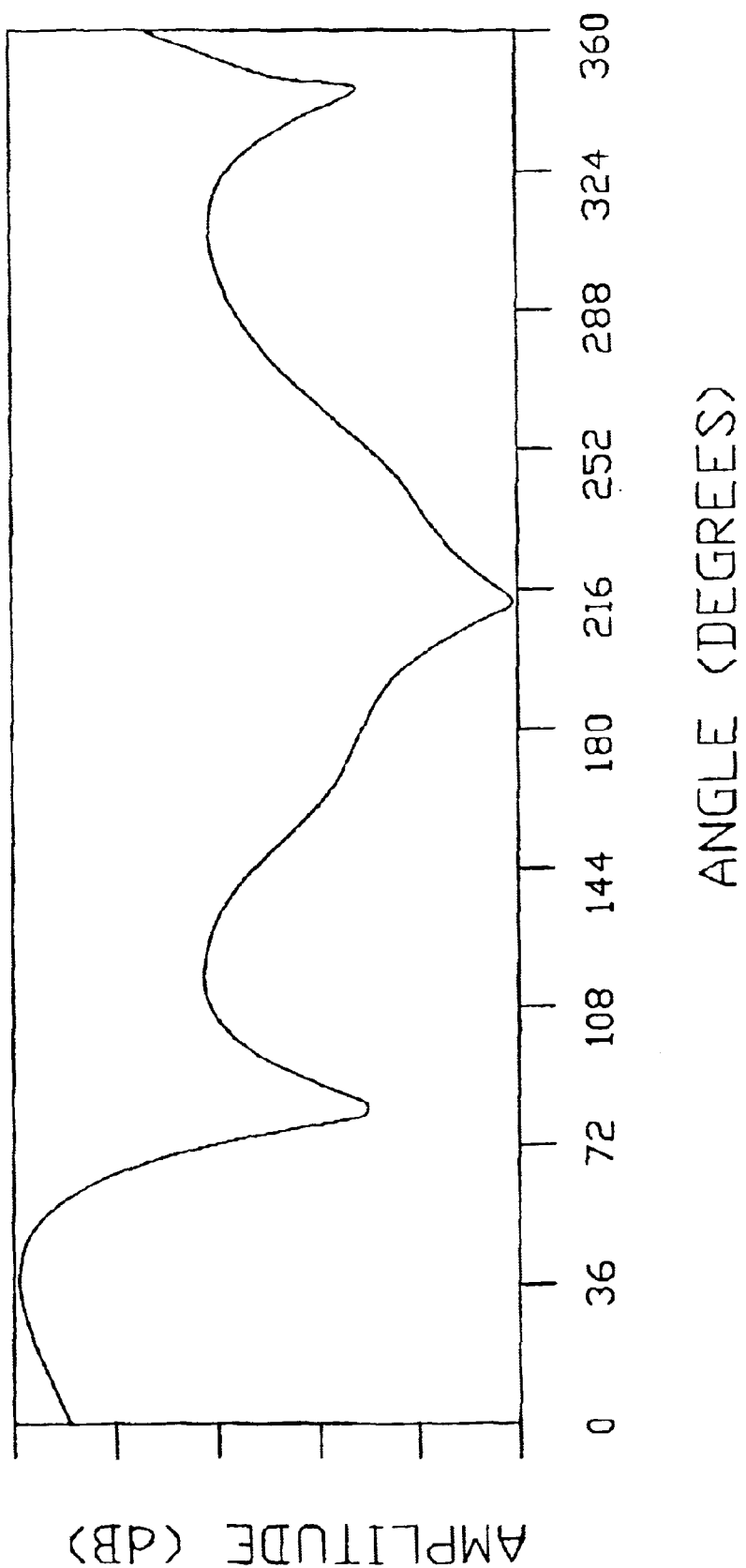

Using a wavelet transform instead of a Fourier transform to synthesize the beams also gives antennas of the present invention smaller effective beamwidths and lower sidelobes than they otherwise would have. This is illustrated in FIG. 4, which shows a circular antenna 11' whose aperture is its diameter D. Also shown are two wavevectors $\vec{k}_1$ and $\vec{k}_2$, corresponding to two plane waves of wavenumber k and different directions, that define a synthetic beam of antenna 11'. The effective beamwidth of antenna 11' as defined herein is the length of the vectorial difference $\Delta \vec{k}$ between the two wavevectors $\vec{k}_1$ and $\vec{k}_2$. Using a Fourier transform to synthesize the beams gives beams with a beamwidth approximately equal to the reciprocal of the aperture of the antenna. Using a wavelet transform to synthesize the beams gives beams with a beamwidth from twenty percent to thirty percent smaller than the reciprocal of the aperture of the antenna. This is further illustrated in FIGS. 5 and 6, which show the $l_2$ norm of $E(\phi)$, for beams synthesized using a wavelet transform (FIG. 5) vs. a Fourier transform (FIG. 6) in the course of the experiment illustrated in FIG. 3. The wavelet transform beam is appreciably narrower, with lower sidelobes, than the Fourier transform beam.

While the invention has been described with respect to a limited number of embodiments, it will be appreciated that many variations, modifications and other applications of the invention may be made.

What is claimed is:

1. A method of tracking a target, comprising the steps of:
   (a) receiving a signal;
   (b) identifying, in said signal, a signature of the target;
   (c) determining, from said signal, a direction to the target; and
   (d) iterating said identifying and said determining, each said identifying after a first said identifying being based on an immediately preceding said determining.

2. The method of claim 1, wherein each said determining is based on an immediately preceding said identifying.

3. The method of claim 1, wherein said iterating is continued at least until a confidence of said identifying exceeds a threshold.

4. The method of claim 1, wherein said iterating is continued at least until said determining converges.

5. The method of claim 1, wherein said receiving is effected using a plurality of antenna elements, each said antenna element receiving a respective portion of said signal; and wherein said determining is effected by steps including:
   (i) for at least a first portion of each said respective portion of said signal, performing a discrete transform of said at least first portion of said each respective portion, thereby obtaining a first plurality of antenna element coefficients; and
   (ii) maximizing an energy of a first weighted sum of said first antenna element coefficients.

6. The method of claim 5, wherein said signature includes a plurality of signature basis functions of said discrete transform; and wherein said sum is limited to said antenna element coefficeints of said signature basis functions.

7. The method of claim 6, wherein each said identifying after a first said identifying is effected by steps including:
   (i) for at least a second portion of each said respective portion of said signal, performing said discrete transform of said at least second portion of said each respective portion, thereby obtaining a second plurality of antenna element coefficients; and
   (ii) forming weighted sums of said antenna element coefficients of said second pluralities in accordance with said direction that is determined in said immediately preceding determining.

8. The method of claim 5, wherein said discrete transform is a Fourier transform.

9. The method of claim 5, wherein said discrete transform is a wavelet transform.

10. The method of claim 9, wherein said basis functions are spline wavelet packet functions.

11. The method of claim 10, wherein said spline wavelet packet functions are eighth-order functions, and wherein said discrete transform includes decomposition of said respective portions up to a seventh level.

12. The method of claim 5, wherein said antenna elements are arranged in a linear array.

13. The method of claim 5, wherein said antenna elements are arranged in a circular array.

14. A method of tracking a target, comprising the steps of:
   (a) receiving a signal;
   (b) identifying, in said signal, a signature of the target;
   (c) determining, from said signal, a direction to the target; and
   (d) iterating said identifying and said determining, each said determining being based on an immediately preceding said identifying.

15. An apparatus for tracking a target, comprising:
   (a) a receiver for receiving a signal; and
   (b) a processor for:
      (i) identifying, in said signal, a signature of the target,
      (ii) determining, from said signal, a direction to the target, and
      (iii) iterating said identifying and said determining, each said identifying after a first said identifying being based on an immediately preceding said determining.

16. The apparatus of claim 15, wherein each said determining is based on an immediately preceding said identifying.

17. The apparatus of claim 15, wherein said receiver includes an antenna having a plurality of antenna elements, each said antenna element receiving a respective portion of said signal, and wherein said determining is effected by steps including:
   (i) for each said respective portion, performing a discrete transform of said each respective portion, thereby obtaining a plurality of antenna element coefficients; and
   (ii) maximizing an energy of a weighted sum of said antenna element coefficients.

18. The apparatus of claim 17, wherein said signature includes a plurality of signature basis functions of said discrete transform; and wherein said sum is limited to said antenna element coefficeints of said signature basis functions.

19. An apparatus for tracking a target, comprising:
   (a) a receiver for receiving a signal; and
   (b) a processor for:
      (i) identifying, in said signal, a signature of the target,
      (ii) determining, from said signal, a direction to the target, and
      (iii) iterating said identifying and said determining, each said determining being based on an immediately preceding said identifying.

* * * * *